United States Patent [19]

Rannenberg

[11] E Patent Number: Re. 31,835

[45] Reissued Date of Patent: Feb. 19, 1985

[54] PNEUMATIC SUPPLY SYSTEM HAVING VARIABLE GEOMETRY COMPRESSOR

[75] Inventor: George C. Rannenberg, Canton, Conn.

[73] Assignee: United Technologies Corporation, Hartford, Conn.

[21] Appl. No.: 562,793

[22] Filed: Dec. 19, 1983

Related U.S. Patent Documents

Reissue of:

[64] Patent No.: 4,405,290
Issued: Sep. 20, 1983
Appl. No.: 210,071
Filed: Nov. 24, 1980

[51] Int. Cl.[3] ..... F04B 27/02

[52] U.S. Cl. ..... 417/282; 415/27

[58] Field of Search ..... 415/1, 15, 17, 27, 28; 417/20, 22, 282

[56] References Cited

U.S. PATENT DOCUMENTS

| | | | |
|---|---|---|---|
| 2,645,410 | 7/1953 | Bauger | 230/114 |
| 2,809,493 | 10/1957 | Paulecka | 60/39.36 |
| 3,045,894 | 7/1962 | Ross | 230/114 |
| 3,095,010 | 6/1963 | McLean | 137/601 |
| 3,214,915 | 11/1965 | Wiebel | 60/50 |
| 3,236,498 | 2/1966 | Kerensky | 253/24 |
| 3,260,046 | 7/1966 | Serriades | 60/35.6 |
| 3,372,862 | 3/1968 | Koenig | 415/27 |
| 3,404,853 | 10/1968 | Miller | 244/55 |
| 3,489,339 | 1/1970 | Greenwald | 230/114 |
| 3,930,746 | 1/1976 | Kronogard | 415/149 |
| 4,225,289 | 9/1980 | Burkett | 417/53 |
| 4,230,437 | 10/1980 | Bellinger et al. | 415/1 |

*Primary Examiner*—Louis J. Casaregola
*Attorney, Agent, or Firm*—John Swiatocha

[57] ABSTRACT

In a compressed air supply system utilizing a shaft-driven compressor (10,16), the flow capacity of the compressor is changed by varying the compressor outlet stator geometry (16) by an actuator (18) which controls the outlet stator geometry to provide an optimum match between the compressor flow capacity and the requirements of the load. The result is a compressed air supply system which satisfies wide variations in demanded flow by the load, while supplying air at maximum pressure with minimum input shaft horsepower.

5 Claims, 6 Drawing Figures

PNEUMATIC SUPPLY SYSTEM HAVING VARIABLE GEOMETRY COMPRESSOR

Matter enclosed in heavy brackets [ ] appears in the original patent but forms no part of this reissue specification; matter printed in italics indicates the additions made by reissue.

DESCRIPTION

1. Technical Field

This invention relates to pneumatic supply systems in which compressed air is supplied to a load by a shaft-driven compressor, and including control means having a variable geometry compressor outlet for automatically satisfying the demands of varying pneumatic loads with improved efficiency.

2. Background Art

Certain prior art, pneumatic supply systems employing shaft driven compressors use actuator systems to vary the compressor outlet geometry to adjust system output. The present invention overcomes various limitations and disadvantages of the prior art by utilizing a variable geometry outlet in the compressor stator in combination with a control, including an actuator which adjusts the outlet stator geometry in accordance with load demands and other operating conditions, for maximum overall efficiency (minimal compressor output dumping) and maximum pressure rise of the pneumatic supply system.

It is therefore an object of the present invention to provide a pneumatic supply system, the output of which is adapted for delivery to a varying pneumatic load at maximum supply pressure and at maximum overall compressor efficiency.

It is another object of the present invention to provide in a pneumatic supply system, the combination of a variable geometry compressor outlet downstream of the compressor rotor, a variable surge dump valve, and actuator means responsive to operating conditions to operate both variable elements in a predetermined mechanical sequence.

It is a further object of the present invention to provide a pneumatic control system having a control means for modulating the compressor outlet geometry to continuously maintain the compressor operation on its surge control line over a very wide range of flow required by the load.

It is another object of the present invention to provide a pneumatic supply system in which the shaft horsepower absorption of the compressor is limited by limiting the geometry of the variable compressor outlet in response to a signal indicative of shaft power overload.

DISCLOSURE OF THE INVENTION

In accordance with the present invention there is provided a pneumatic supply system employing a compressor which delivers air to a load, the compressor having variable outlet geometry to provide the effect of a variable compressor without actually changing the geometry of the compressor rotor itself. By varying the flow capacity of the outlet geometry disposed in the stator in the preferred embodiment, the flow capacity of the compressor is varied while the pressure rise remains relatively unaffected. The pressure rise of the variable compressor is therefore, determined only by the speed of the rotor. Additionally, a control means is employed to vary the compressor outlet geometry, and consists of a single actuator positioned in response to the output from a comparator which receives signals from sensors which measure the flow through the compressor, and a signal from a referenc which is indicative of desired flow to the load. The comparator signals the actuator to control the compressor geometry to produce a flow which satisfies the desired load flow while at the same time preventing surge. As flow demand of the load decreases, the effective size of the compressor is reduced by decreasing the capacity of the variable outlet geometry by operating with the geometry scheduled to maintain the compressor directly on its surge control line. This results in maximum pressure rise and maximum efficiency. If flow to the load is completely shut off, or decreases so far that surge cannot be prevented by decreasing diffuser geometry, a surge pump valve is then opened. The surge dump valve is operated in mechanical sequence with the diffuser geometry, both being driven by the single actuator.

Additional control means, such as means for protecting the compressor shaft power source from overloading may be employed. These protecting means measure a signal from the shaft power source indicative of its having reached its power limit, such signal being motor temperature, motor current or power, shaft torque, or any other indicia of overload. The overload signal is compared to a maximum permissible signal, and if overload is indicated the actuator is actuated to reduce weight flow, and therefore, torque absorption of the compressor, to avoid continued overloading of the shaft power source.

The foregoing, and other features and advantages of the present invention, will become more apparent from the following description and accompanying drawing.

BEST MODE FOR CARRYING OUT THE INVENTION

Figure 1:
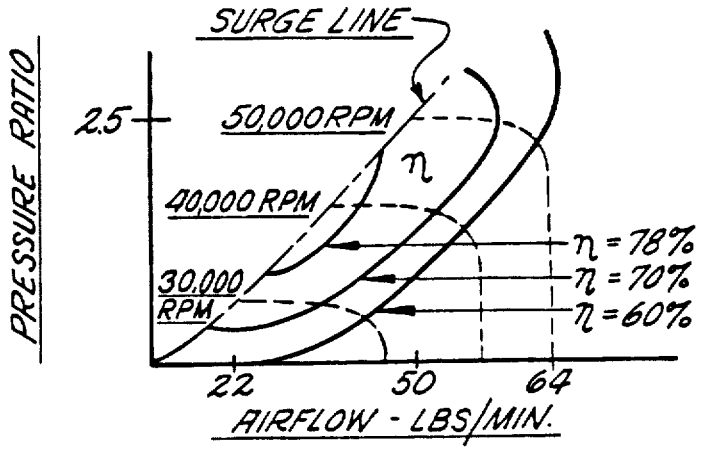
FIG. 1 is a plot of the pressure ratio versus airflow characteristics of typical prior art fixed geometry centrifugal compressors.
Figure 2:
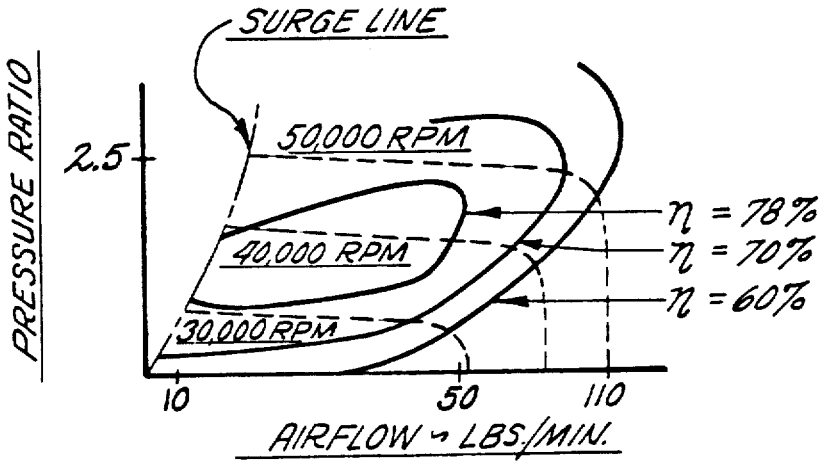
FIG. 2 is a plot of the pressure ratio versus airflow characteristics of a centrifugal compressor using variable geometry outlet diffuser vanes.

Referring to FIGS. 1 and 2, there is shown a comparison between the performance of a prior art fixed geometry centrifugal compressor (FIG. 1), and that of a variable outlet stator geometry (diffuser vane) centrifugal compressor of equal size (FIG. 2). In the Figures, $\eta$ = efficiency. The Figures are in fact maps of compressor performance in which pressure ratio is plotted against airflow. In FIG. 1, at any given operating speed of the compressor, a limited flow range is available between the point of compressor surge (to the left of the surge line), and the choked condition where no more airflow can pass. It should be noted that as operating conditions move away from the surge line, compressor efficiency drops off rather quickly. The capacity range or operating range of the compressor at acceptably high efficiencies is typically about 1.25 to 1. The same size compressor is shown in FIG. 2 with movable vanes employed in the compressor outlet geometry. As shown, the variable geometry flow or capacity range for this compressor is 6 to 1, over four times that of the equivalent sized fixed geometry compressor. The broad, high efficiency range also results in significant savings in system weight and power dissipation. The surge line of FIG. 2 is far to the left, indicating a wide compressor operating range without risk of surge.

Figure 3:
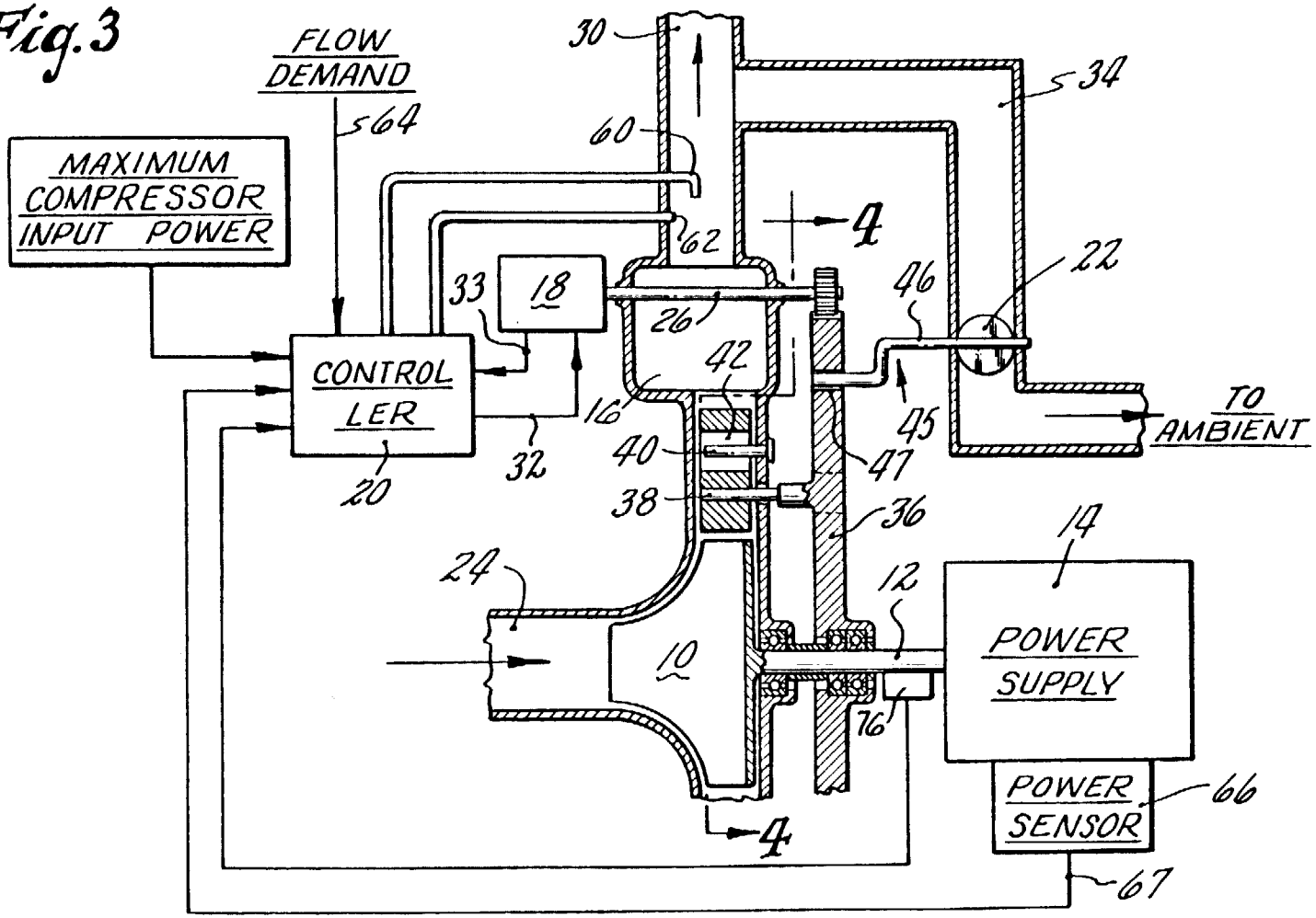
FIG. 3 is a schematic diagram showing a preferred implementation of a pneumatic supply system using the variable compressor geometry and control system of the present invention.

The pneumatic supply system of the present invention provides a means for effectively utilizing the high efficiency, broad operating range characteristics of variable outlet geometry compressors. FIG. 3 shows the elements essential to practicing the present invention including a compressor rotor 10 driven via a shaft 12 from a source of power 14 such as an electric motor, variable outlet stator geometry 16 at the exit of the compressor rotor 10, and a control means including an actuator 18 responsive to a controller 20 for modulating the geometry of the diffuser 16 to produce operation of the compressor driven pneumatic supply system at maximum efficiency and maximum pressure rise. It will be recognized that the stator outlet recovers as increased pressure, the velocity energy imparted to the flow by the compressor rotor. In the preferred embodiment, this variable geometry outlet comprises a plurality of adjustable diffuser vanes which vary the outlet flow area. However, it will be understood that any means such as variably positioned diffuser walls which vary the stator outlet geometry to achieve a desired flow, may be employed without departing from the present invention. Also employed is a surge dump valve 22 driven in conjunction with the variable outlet 16 by actuator 18.

Figure 4:
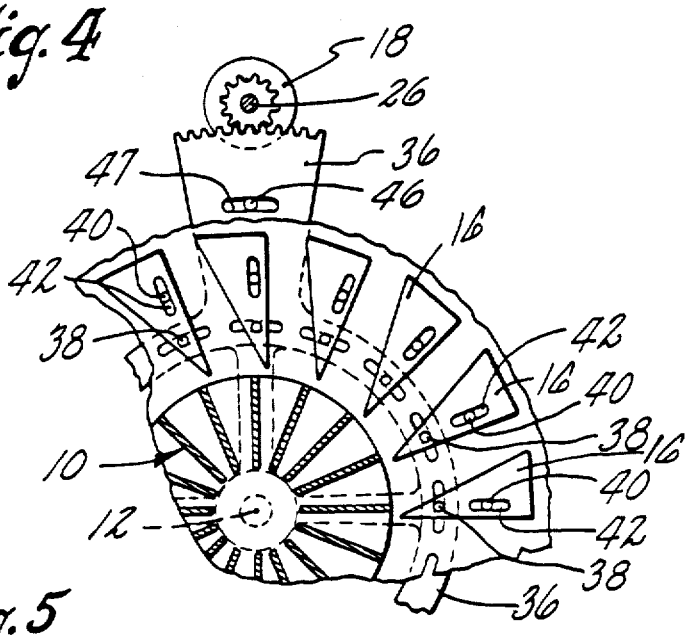
FIG. 4 is a cross-sectional view of a preferred implementation of a variable geometry compressor diffuser using movable diffuser vanes.
Figure 5:
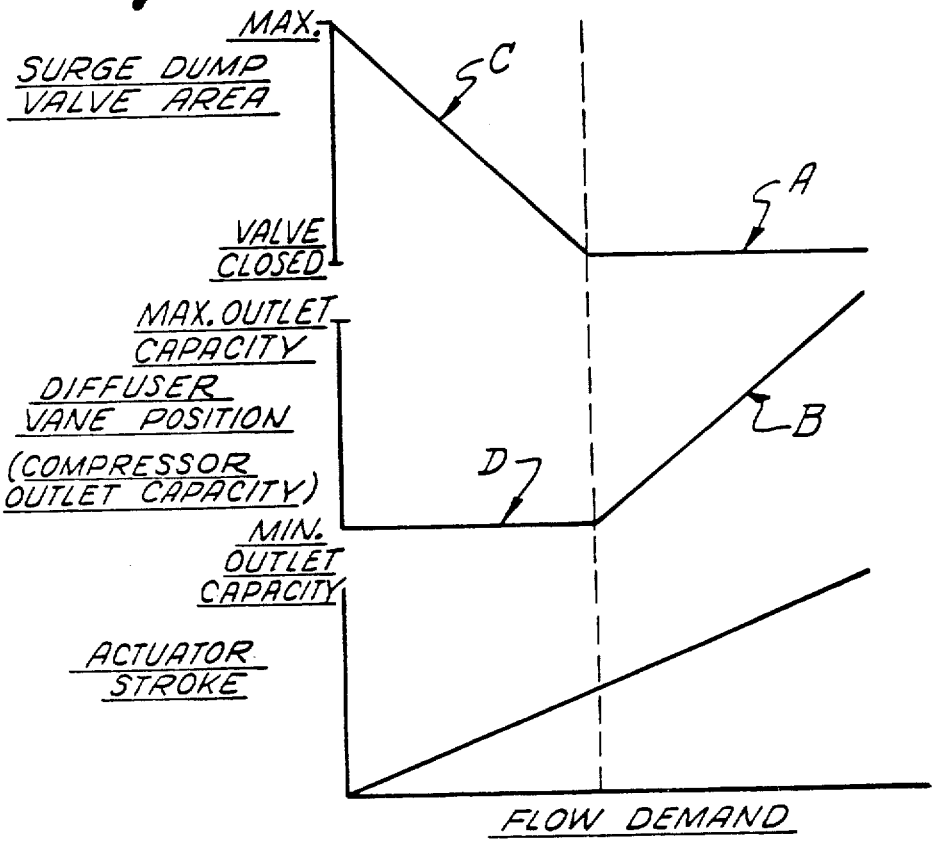
FIG. 5 is a plot of the sequential relationship between diffuser vane position as implemented in the diagram of FIG. 3, actuator stroke, and surge dump valve area.

Air to be delivered by the pneumatic supply system enters the compressor at the inlet 24. The air entering the inlet will generally, but not necessarily, be at approximately atmospheric pressure, one exception being when the system is used with an aircraft environmental control system for cabin pressurization wherein the compressor inlet air may be pressurized by the motion of the aircraft relative to ambient. After leaving the compressor rotor 10 the air enters the variable diffuser 16. Variable vanes 16 as shown in the preferred embodiment, and data on their performance and construction are disclosed in ASME publication 77-ENAs-7, July 11, 1977, pp. 1-5, in an article entitled "Variable Geometry Air Cycle Machine" by J. Tseka and G. C. Letton, Jr. The performance data in FIGS. 1 and 2, and the compressor diffuser vane construction of FIGS. 4 and 5, are derived from this publication.

Referring again to FIG. 3, the position of diffuser vanes 16 is determined by the stroke position of the actuator 18 which is connected to the vanes via connecting shaft 26. The air, after passing through the diffuser vanes 16, enters compressor discharge housing 28 and is delivered to the load, not shown, via duct 30.

The construction of the actuator 18 is not shown in detail since any of various well known types of actuators could be used, for example, a solenoid operated motor or servo which provides rotary motion to shaft 26 which in turn is connected to vanes 16. The basic criterion is that the actuator, in response to a signal from controller 20 fed to the actuator via line 32, vary the position of shaft 26 so as to position vanes 16. A feedback signal indicative of actuator (diffuser vane) setting is provided to controller 20 from actuator 18 through line 33.

To prevent surge at very low weight flow (a flow represented in the area to the left of surge line B of FIG. 2), the surge dump valve 22 is opened to let whatever portion of compressor flow escape to ambient through conduit 34 as is necessary to prevent compressor surge. The surge dump valve 22 is operated in conjunction with movement of variable compressor vanes 16 in the sequence shown in FIG. 5. Mechanically, vanes 16 are hingedly connected to a drive ring 36 by pins 38 and pinned to any suitable compressor stator structure by pins 40 received through cam slots 42 provided in the vanes (FIG. 4) whereby movement of one of the vanes or the ring causes movement of the remainder of the vanes. Actuator 18 is connected to the vanes in any suitable manner as determined by the type of actuator employed. In the preferred embodiment, ring 36 is provided with teeth 43 engaging pinion 44 rotatably powered by the actuator to drive the ring. Rotation of the vanes by the actuator adjusts both the mutual spacing and relative angular orientation of the vanes to achieve a desired weight flow. The drive ring and vanes are connected to dump valve 22 via crank assembly 45 comprising crank shaft 46 which engages ring 36 through cam slot 47 therein, the cam slot providing a lost motion connection between the ring and the surge dump valve 22. The lost motion connection moves the surge dump valve only after the vanes 16 have reached positions defining a minimum capacity diffuser geometry. The schedule, shown in FIG. 5, indicates that when the actuator 18 has moved the vanes to any position between the maximum and minimum compressor diffuser geometries, the surge dump valve is closed. However, at lower flows (those that would be to the left of the surge line of FIG. 2), the surge dump valve begins to open, and reaches its fully open position at minimum or zero flow to the load. In other words, surge is prevented by actuator 18, in response to a signal on line 32 from controller 20, first sending the compessor diffuser geometry toward a smaller compressor capacity, and then after the smallest geometry compressor is reached, gradually opening surge valve 22.

The function of determining when the surge valve must open and how far it must open is determined by controller 20. The controller 20 receives a signal from a compressor flow sensor located in load supply flow duct 30, the flow sensor preferably consisting of a total pressure sensor 60 $P_t$ and a static pressure sensor 62 $P_s$ which enable controller 20 to determine flow to the load. Other locations for pressure taps, and/or other means for sensing compressor flow, may be used.

Also supplied to controller 20 is a flow demand signal from the load on line 64. This signal could be produced by a flow selector rheostat manually positioned by the operator of the pneumatic supply system, or from any number of automatically generated flow demand signals such as ventilation flow required to satisfy the controls of an aircraft ventilating air system such as that described in U.S. Pat. No. 3,699,777 entitled "Capacity Control for Gas Turbine Powered Air Cycle Refrigeration System" and assigned to the assignee of the present invention. An alternate source of flow demand signal 64 could be a simple load supply pressure signal, e.g., controller 20 could modulate the position of the diffuser vanes 16 to satisfy a selected value of pressure in the load supply duct 30 as provided via compressor discharge housing 28. The choice of load demand signal is determined by design details of the pneumatic supply system.

Also fed to controller 20 is a signal indicative of shaft power supplied to the compressor. This signal, from sensor 66 attached to power source 14, is fed to controller 20 via a signal line 67. The power sensor may take the form of a current sensor, electrical power sensor, torque sensor, temperature sensor, or any other device which would indicate the power produced by power source 20 to drive compressor rotor 10. As will be described, when an overload is sensed, the stator outlet geometry is set to [its highest] *a lower* flow capacity position to reduce the load on the compressor.

Figure 6:
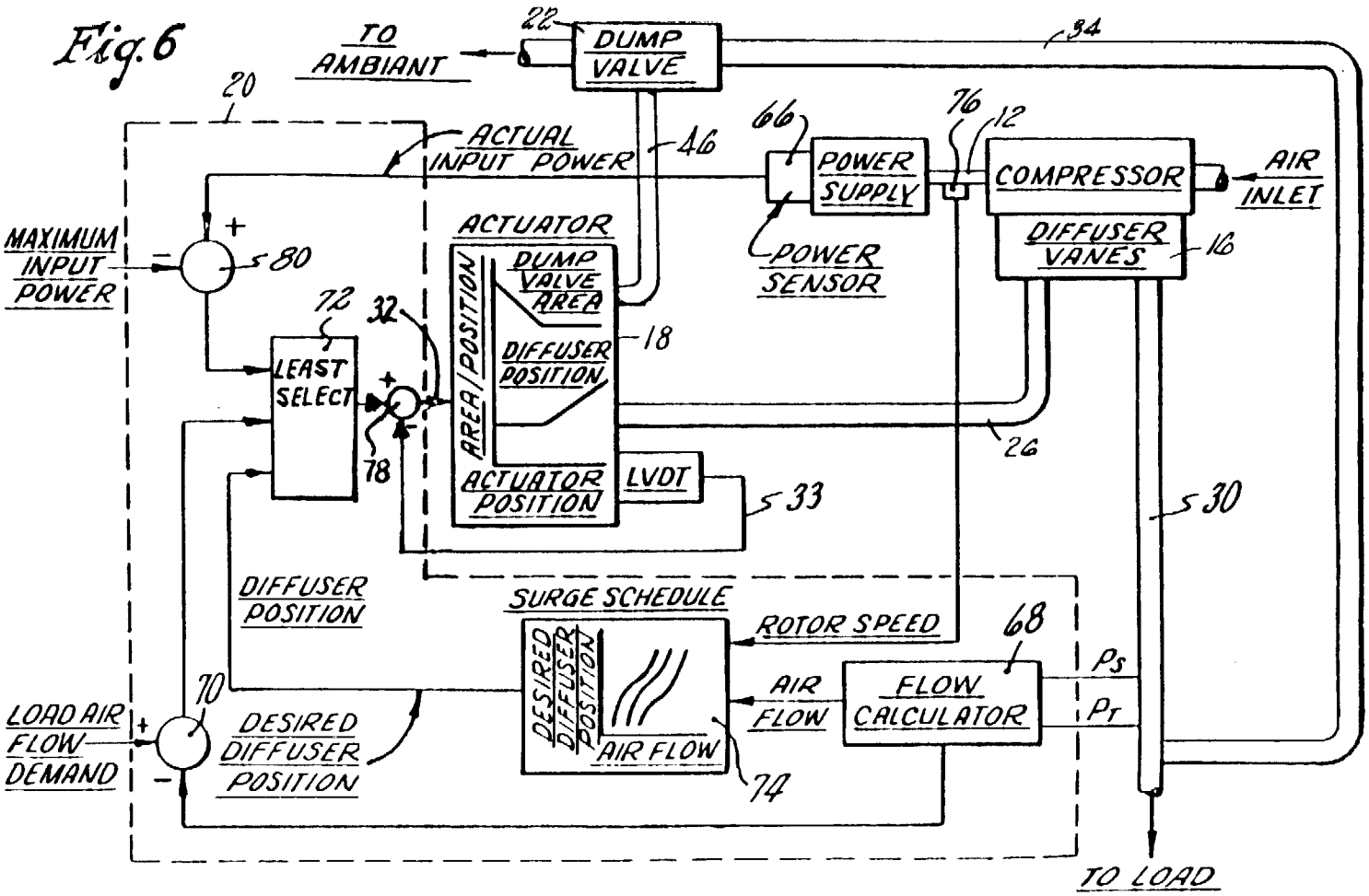
FIG. 6 is a functional schematic diagram showing the control system of the present invention.

The details of the controller 20 are shown in schematic fashion in FIG. 6, the controller being enclosed in dashed lines. The controller receives various input signals as shown in FIG. 3, and produces an output signal one line 32 which directs or schedules the position of actuator 18 and thereby controls the diffuser geometry and dump valve area. The controller can be implemented in various ways, although preferably it is composed of electronic or hydraulic elements. The best mode presently contemplated will be described.

Referring to FIG. 6, controller 20 receives input signals of actual power consumed by the compressor and maximum allowable compressor power input, air flow required by the load, static and total pressures of the compressor discharge air and the position of the compressor outlet (diffuser vane) geometry. The controller includes a flow calculator 68 which calculates the weight flow output of the compressor from the static and total pressure $P_s$ and $P_t$ sensed in duct 30. This weight flow output signal is fed to comparator 70 which compares this signal with weight flow required by the load. The output of the comparator represents an airflow error or difference between these signals and is fed to least selector 72. The actual weight flow output signal from flow calculator 68 is also fed to surge schedule 74 which, from that signal and a compressor speed signal from speed sensor 76 determines or schedules a desired compressor outlet (diffuser) geometry which causes the compressor to run in its highest efficiency (along the surge line). This desired outlet geometry signal from schedule 74 is fed [to comparator 78 which compares that signal with the signal indicative of actual compressor outlet geometry (line 33) and determines a geometry error signal which is also fed] to least selector 72. An error signal indicating the difference between signals representing the maximum allowable compressor input power and the actual compressor input power (from power sensor 66) is calculated by comparator 80 and fed to least selector 72. As its name implies, least selector 72 selects the error signal of least magnitude from the power, airflow and diffuser position error signals. This least error signal is fed to *comparator 78 which compares that signal with the signal indicative of actual compressor outlet geometry (line 33) and determines a geometry error signal which is also fed to* actuator 18 [which] . *Actuator 18* sets the dump valve and variable outlet geometry to eliminate this least error in accordance with the dump valve and diffuser position operating schedules of FIG. 5.

In operation, assuming that the load demand is at a steady state, high weight flow value, corresponding to maximum compressor output, the power error signal is zero (maximum compressor power input equal to actual power input) and therefore, the least selector will pass a zero error signal to the actuator despite any further increase in flow demand. As load demand diminishes to a value less than that of the actual compressor output, a negative airflow error signal is applied to least selector 72 which passes this signal to actuator 18. Actuator 18 adjusts (closing down) the diffuser vanes to achieve the desired airflow. This airflow is input with the compressor speed to surge schedule 74 in the manner described hereinabove, schedule 74 providing a signal indicative of a diffuser position adapted to achieve the desired airflow at optimal efficiency. The error between this signal and the actual diffuser position is passed to the actuator by least selector 72 wherein the actuator sets the diffusers to the optimal setting determined by schedule 74.

Referring to FIG. 5, the adjustment of the diffuser vanes to achieve the desired (reduced) flow is indicated by segments A and B of the dump valve area and diffuser vane position curves. As shown in the dump valve area curve, the lost motion connection between crank 46 and ring 36 allows a substantial adjustment in the diffuser vanes without opening surge dump valve 22. Thus, the output of the supply system is delivered at optimal efficiency (maximum pressure rise) since no energy is expended in pressurizing air which in prior art supply systems would be dumped through valve 22 when not required by the load.

As flow demand continues to decrease, the vanes will effectually close to an extent that further closure without dumping of a portion of the flow to meet minimal flow demands would result in compressor surge. At these operating conditions, further displacement (stroke) of actuator 18 is transmitted to crank 46 by the lost motion connection, thereby opening surge dump valve 22. Such valve opening dumps a portion of the compressor output thereby preventing compressor surge at such minimal flow demand conditions. The opening of the dump valve is indicated by line segment C of the surge dump valve area curve of FIG. 5. As shown in the diffuser vane position curve (segment D) of FIG. 5, the opening of the surge dump valve is accompanied by no further movement of the diffuser vanes. It will be understood that such stationary disposition of the diffuser vanes is achieved by an orientation of cam slows 42 generally parallel to the direction of drive ring rotation when the diffuser vanes are in their most closed orientation.

Accordingly, it will be appreciated that the present invention provides a pneumatic supply system which delivers a required airflow efficiently, at a maximum possible pressure rise. Dumping is only required at minimal required flows and therefore, does not represent a significant deterioration of system efficiency. It will be further appreciated that such efficiency is maintained despite system safeguards which prevent both compressor surge and overload.

Although this invention has been shown and described with respect to detailed embodiments thereof, it will be understood by those skilled in the art that various changes in form and detail thereof may be made without departing from the spirit and scope of the claimed invention.

I claim:

1. A pneumatic supply system characterized by:

a compressor including a variable geometry stator portion included in an outlet portion of said compressor, for providing delivery by said compressor of an airflow of varying magnitude in accordance with demands of a load;

actuator means for operating said variable geometry stator portion;

a dump valve disposed in fluid communication with said compressor outlet and sequentially operated with said variable geometry stator portion by said actuator means; and control means responsive to the flow demand of said load, the flow output of said compressor, the power input and maximum allowable power input to said compressor and the position of said variable geometry stator portion for controlling said actuator means, thereby controlling the actuation of said variable geometry stator portion and said dump valve.

2. The pneumatic supply system of claim 1 characterized by said compressor being of a centrifugal variety and said variable geometry stator portion comprising a plurality of diffuser vanes disposed radially outwardly of said compressor rotor and pivotally connected to a movable member driven by said actuator means, whereby driving of said movable member by said actuator means pivotally displaces said diffuser vanes thereby adjusting the flow capacity of said compressor.

3. The pneumatic supply system of claim 1 characterized by said dump valve being operably connected to said variable geometry stator portion by a lost motion connection, said lost motion connection accommodating a predetermined amount of diffuser vane displacement prior to transmission of said actuator displacement to said dump valve for actuation thereof whereby said dump valve is only opened subsequent to said stator being set by said actuator means to a position corresponding to minimum flow through said outlet.

4. The pneumatic supply system of claim 1 characterized by said control means including means for determining a flow error between the flow demand of said load and the flow output of said compressor, means for determining a power error between the input power to said compressor and the maximum allowable input power to said compressor, means for determining [an outlet geometry error between an actual] *a desired* setting of the variable geometry stator portion [and a setting of the variable geometry stator portion required to achieve said flow demand of said load] *for operation of said compressor at an optimal efficiency thereof], said flow*[,] *and* power [and outlet geometry] errors *and said desired variable geometry setting* being applied to at least select means, said least select means selecting *as an output signal thereof,* the least of said errors *and desired geometry setting* and providing [an] *said* output [control] signal to *means for providing a signal indicative of a geometry error between said output signal and a signal indicative of the actual setting of said actuator means, said geometry error signal being applied to* said actuator means [corresponding to said least error.] *for adjusting said variable geometry to minimize said geometry error.*

5. The pneumatic supply system of claim 4 characterized by means to monitor the speed of said compressor and a surge schedule responsive to flow output of said compressor and the speed thereof for formulating variable geometry stator portion settings required to achieve said flow demand while said compressor operates along a surge line thereof.

* * * * *